(12) United States Patent
Albers

(10) Patent No.: US 10,975,989 B2
(45) Date of Patent: Apr. 13, 2021

(54) INTUMESCENT FIRE SLEEVE, COIL OF SEVERAL INTUMESCENT FIRE SLEEVES AND METHOD FOR INSTALLATION OF AN INTUMESCENT FIRE SLEEVE

(71) Applicant: Rockwool International A/S, Hedehusene (DK)

(72) Inventor: Rainer Albers, Horstmar (DE)

(73) Assignee: Rockwool International A/S, Hedehusene (DK)

( * ) Notice: Subject to any disclaimer, the term of this patent is extended or adjusted under 35 U.S.C. 154(b) by 193 days.

(21) Appl. No.: 15/738,080

(22) PCT Filed: Jun. 9, 2016

(86) PCT No.: PCT/EP2016/063202
§ 371 (c)(1),
(2) Date: Dec. 19, 2017

(87) PCT Pub. No.: WO2016/202681
PCT Pub. Date: Dec. 22, 2016

(65) Prior Publication Data
US 2018/0306352 A1    Oct. 25, 2018

(30) Foreign Application Priority Data

Jun. 19, 2015   (EP) .................................... 15172912

(51) Int. Cl.
*F16L 5/04*       (2006.01)
*H02G 3/04*       (2006.01)
(Continued)

(52) U.S. Cl.
CPC .............. *F16L 5/04* (2013.01); *A62C 2/065* (2013.01); *H02G 3/0412* (2013.01); *H02G 3/22* (2013.01); *F16L 2201/60* (2013.01)

(58) Field of Classification Search
CPC ... A62C 2/065; A62C 3/16; F16L 5/04; F16L 2201/60; H02G 3/0412; H02G 3/22
(Continued)

(56) References Cited

U.S. PATENT DOCUMENTS 4,467,577 A * 8/1984 Licht .................... B32B 9/00
                                                          52/232
5,058,341 A * 10/1991 Harbeke, Jr. .......... A62C 2/065
                                                          52/232
(Continued)

FOREIGN PATENT DOCUMENTS

EP        0486299 A1    5/1992
WO    WO-0068608 A1    11/2000
(Continued)

OTHER PUBLICATIONS

International Preliminary Report on Patentability, corresponding to PCT/EP2016/063202, dated Dec. 19, 2017, 10 pages.

*Primary Examiner* — Cody J Lieuwen
(74) *Attorney, Agent, or Firm* — Harness, Dickey & Pierce, P.L.C.

(57) ABSTRACT

The disclosure relates to an intumescent fire sleeve for a conduit, such as a pipe, a cable or a device penetrating a wall, a ceiling or a floor in a building, said fire sleeve comprising at least one layer of intumescent material and one carrier being connected to the layer of intumescent material, and said fire sleeve having a length (L) that at least corresponds to a circumference of the conduit for which it is intended, with the characteristics that at least the carrier has spring-loaded characteristics and that the carrier, in a non-applied position has the ability to coil onto itself in a spiral manner. The disclosure also relates to a coil of such intumescent fire sleeves and to a method for installation of such an intumescent fire sleeve.

5 Claims, 6 Drawing Sheets

(51) Int. Cl.
*H02G 3/22* (2006.01)
*A62C 2/06* (2006.01)

(58) Field of Classification Search
USPC .............................................. 169/48; 52/232
See application file for complete search history.

(56) References Cited

U.S. PATENT DOCUMENTS

| | | | | |
|---|---|---|---|---|
| 5,498,466 | A * | 3/1996 | Navarro | A62C 2/065 428/408 |
| 5,634,304 | A * | 6/1997 | Sakno | F16L 5/04 138/119 |
| 6,425,494 | B1 * | 7/2002 | Woods, II | B65D 81/3879 215/12.1 |
| 6,725,615 | B1 * | 4/2004 | Porter | A62C 2/065 52/232 |
| 2004/0149390 | A1 * | 8/2004 | Monden | F16L 5/04 156/391 |
| 2007/0148394 | A1 * | 6/2007 | Foerg | E04G 15/061 428/55 |
| 2010/0270040 | A1 * | 10/2010 | Merchant | A62C 3/02 169/45 |
| 2014/0007373 | A1 * | 1/2014 | Muenzenberger | A62C 2/065 16/2.2 |
| 2015/0285426 | A1 * | 10/2015 | Shaw | F16L 59/026 428/34.5 |

FOREIGN PATENT DOCUMENTS

| | | |
|---|---|---|
| WO | WO-2005011569 A2 | 2/2005 |
| WO | WO-2009090247 A1 | 7/2009 |
| WO | WO-2014202807 A1 | 12/2014 |

\* cited by examiner

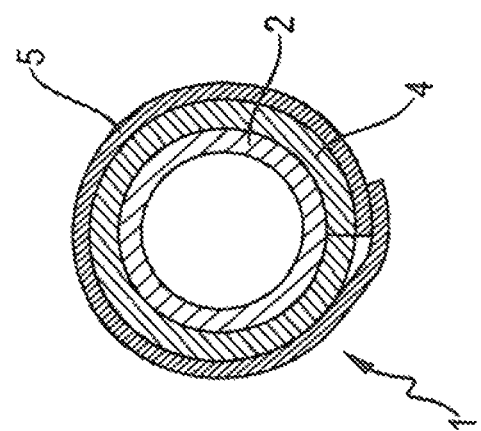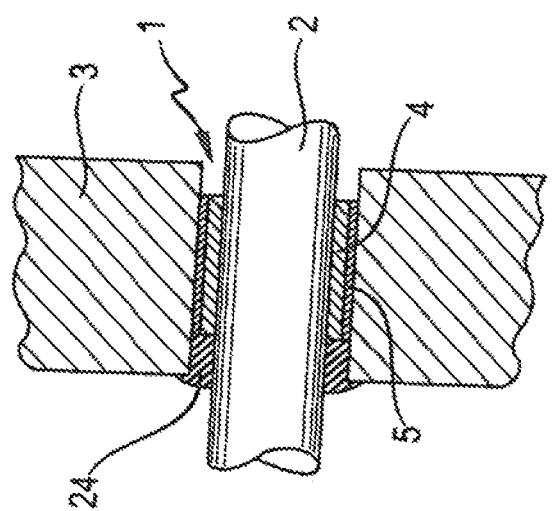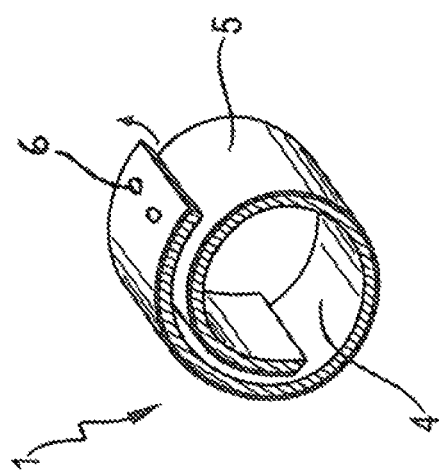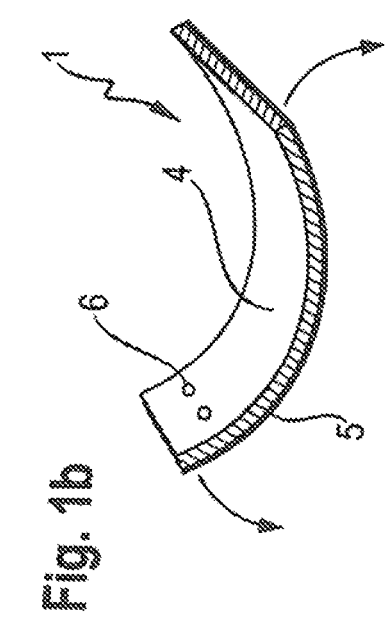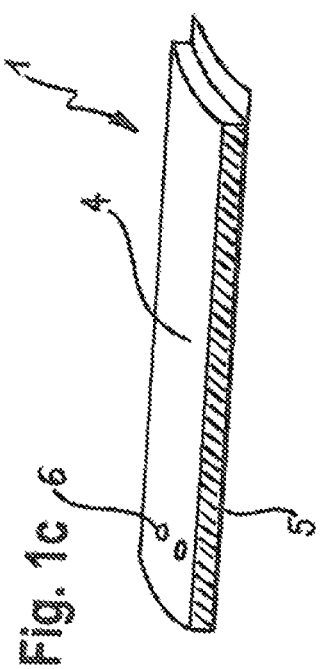

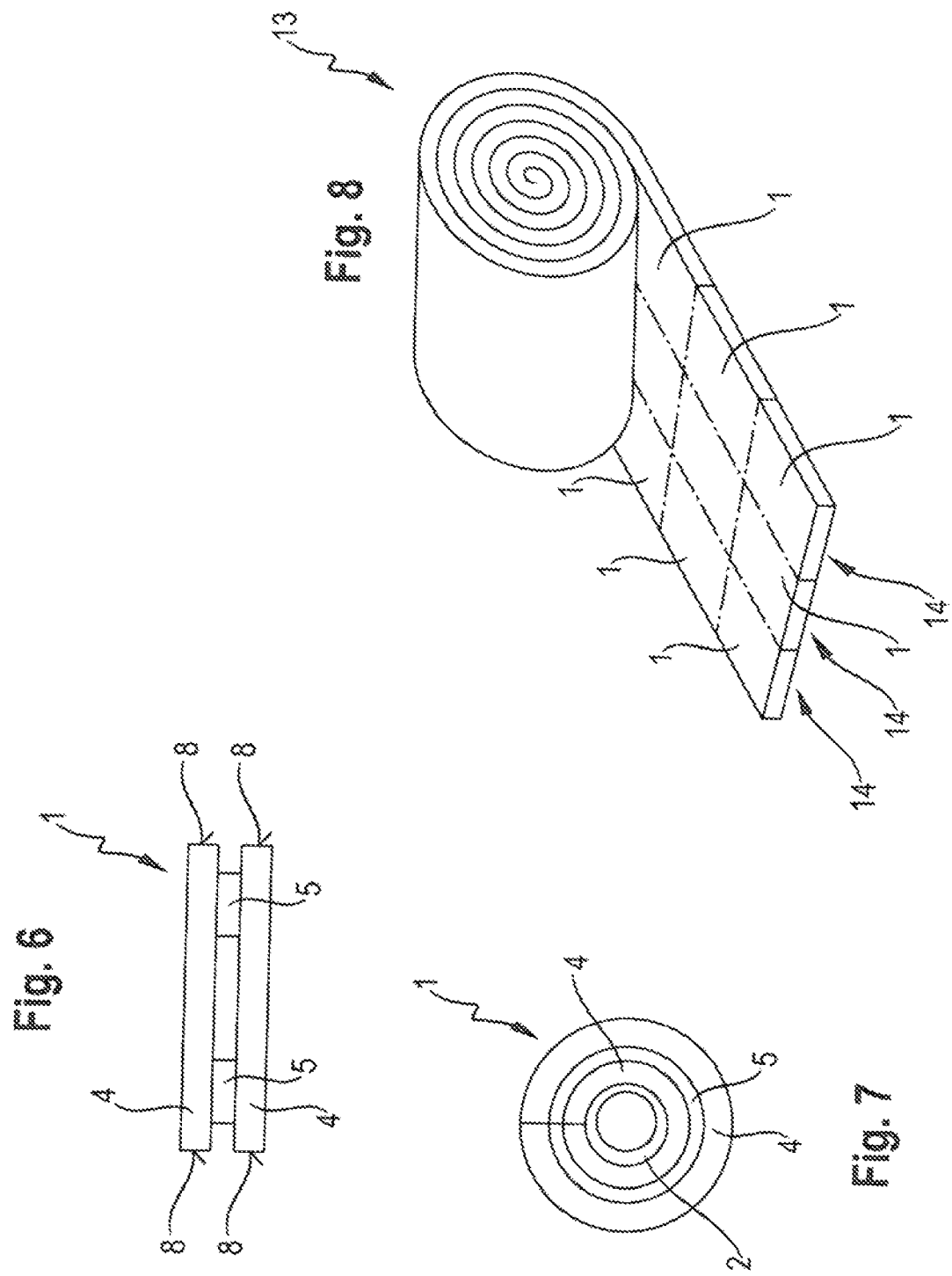

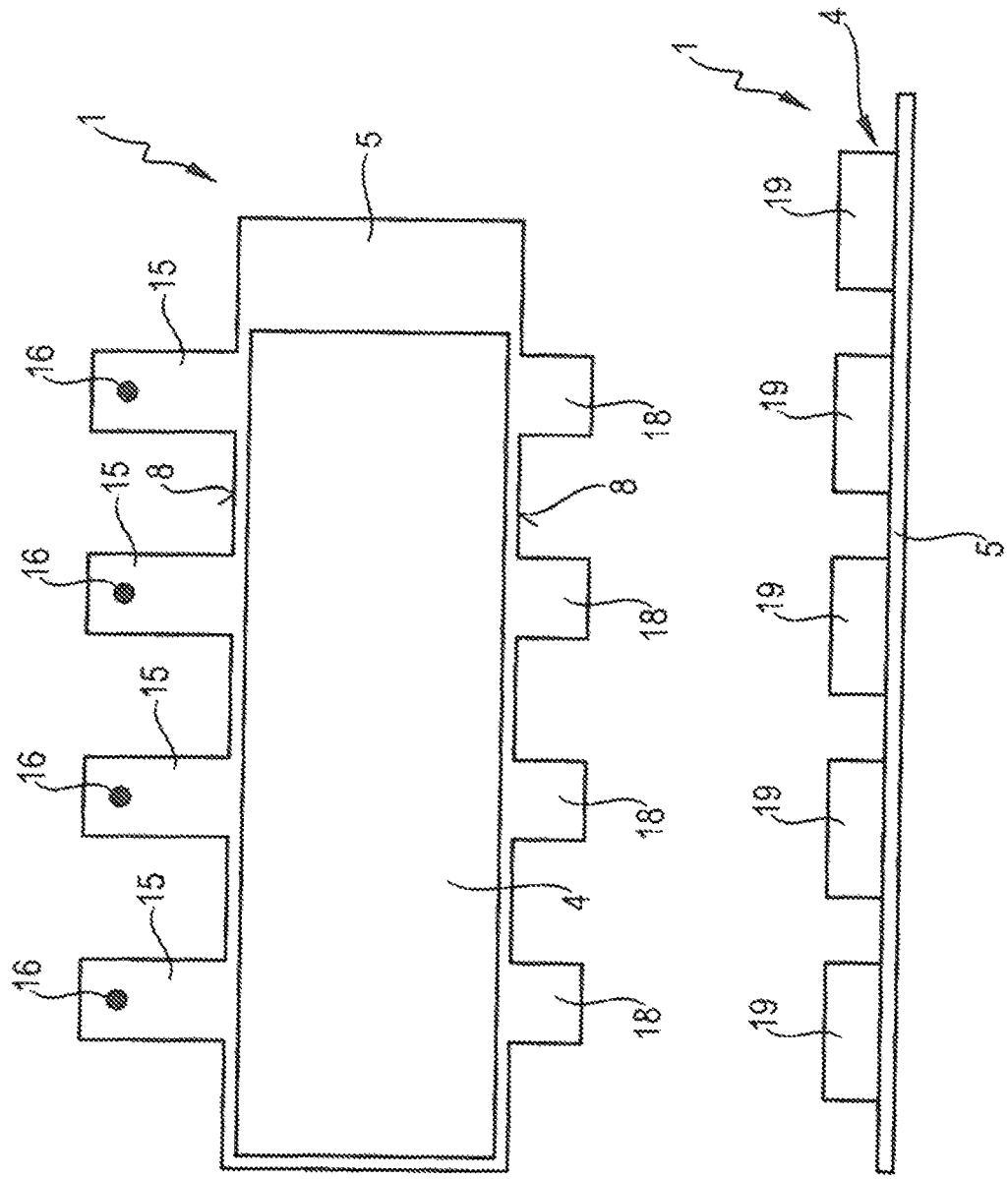

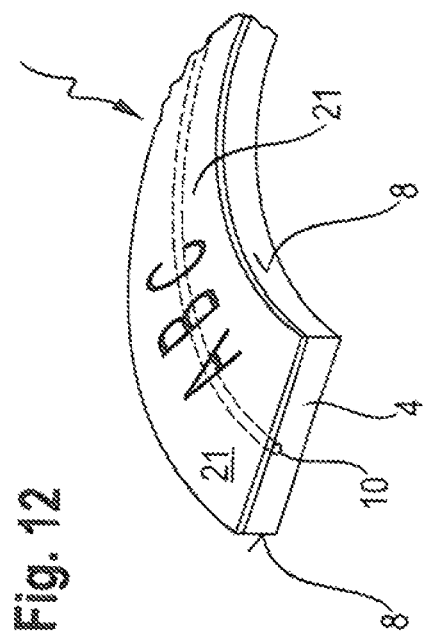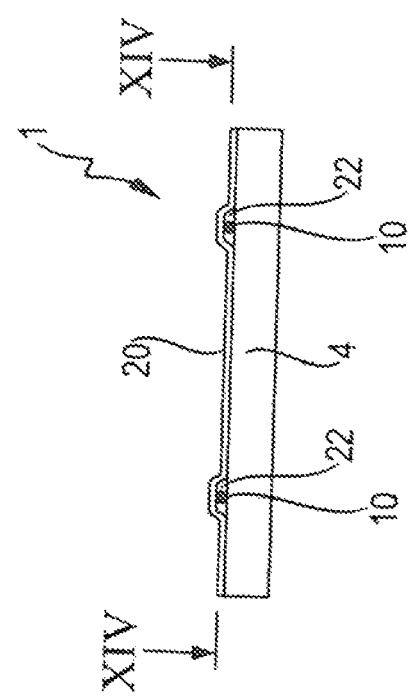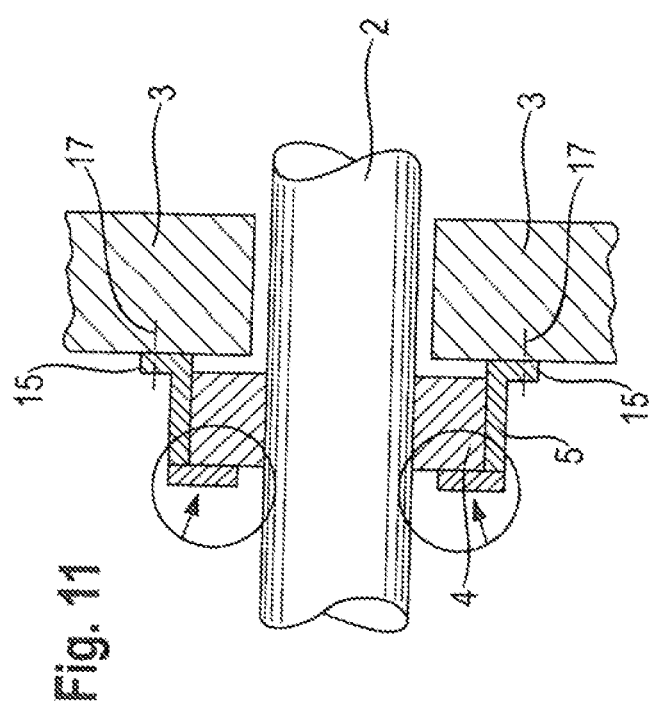

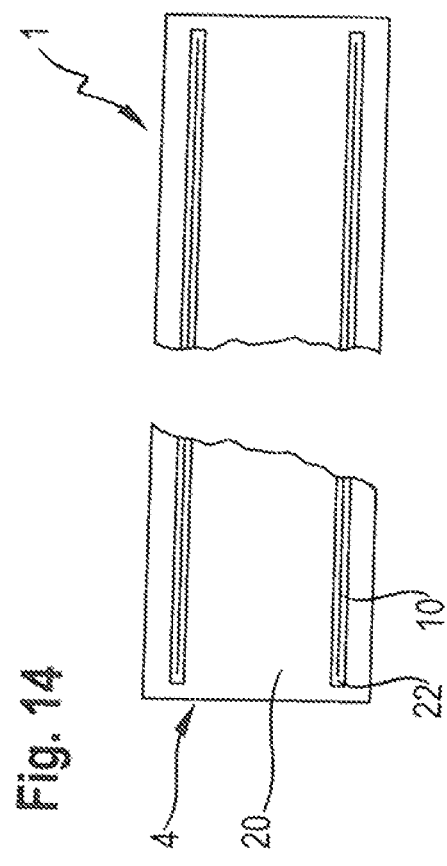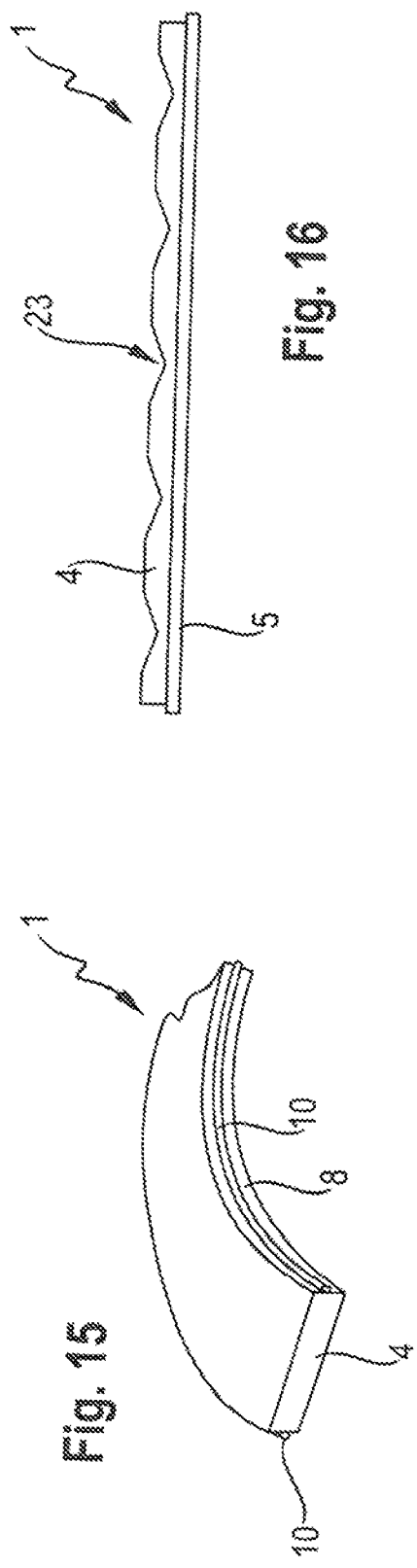

INTUMESCENT FIRE SLEEVE, COIL OF SEVERAL INTUMESCENT FIRE SLEEVES AND METHOD FOR INSTALLATION OF AN INTUMESCENT FIRE SLEEVE

CROSS-REFERENCE TO RELATED APPLICATIONS

This application is a National Stage of International Application No. PCT/EP2016/063202, filed on Jun. 9, 2016, and published in English as WO2016/202681 A1 on Dec. 22, 2016. This application claims priority to European Patent Application No. 15172912.6, filed on Jun. 19, 2015. The entire disclosures of the above applications are incorporated herein by reference.

FIELD

Main subject of the disclosure is an intumescent fire sleeve for a conduit penetrating a wall, a ceiling or a floor in a building, said fire sleeve comprising at least one layer of intumescent material and one carrier being connected to the layer of intumescent material, and said fire sleeve having a length that at least corresponds to a circumference of the conduit for which it is intended. The conduits can for example be pipes, cables or devices. Furthermore, the disclosure relates to a coil of several intumescent fire sleeves for conduits being provided to penetrate a wall, a ceiling or a floor in a building, each comprising at least one layer of intumescent material and one carrier being connected to the layer of intumescent material, and said fire sleeve having a length that at least corresponds to a circumference of the conduit for which it is intended. Finally, the disclosure relates to a method for installation of an intumescent fire sleeve to the circumference of a conduit penetrating a wall, a ceiling or a floor in a building, whereby said fire sleeve comprising at least one layer of intumescent material and one carrier being connected to the layer of intumescent material is applied to the circumference of the conduit penetrating the wall, the ceiling or the floor in a building, and whereby said fire sleeve having a length which at least corresponds to the circumference of a conduit.

BACKGROUND

This section provides background information related to the present disclosure which is not necessarily prior art.

Intumescent fire sleeves are well known in the prior art for closing gaps that appears in a wall, a ceiling or a floor in a building, when the conduit, such as a pipe, a cable or any other device, has melted or burned away during a fire. The intumescent material expands drastically due to the heat from the fire and closes the gap.

For example the applicant offers intumescent pipe wraps called "Rockwool Fire Pro" which is a fire protection product. These intumescent pipe wraps offer a simple and more economical alternative to more advanced fire stop pipe collars, for fire stopping plastic pipework and electrical tracking in walls and floors and will provide up to at least two hours fire protection. Furthermore, these intumescent pipe wraps comprise layers of a graphite based intumescent sheet encapsulated in a polyethylene sheath. The pipe wrap is intended to be wrapped around the outside diameter of the pipe work or trunking and is secured by means of a self-adhesive strip. The intumescent pipe wrap is then positioned within the compartment wall or floor so that the edge of the pipe wrap is left exposed at the face of the wall or soffit. The pipe wrap is then sealed into the structure with a firestop compound. Under fire conditions, the intumescent material expands against the structure and fills the void left by the burnt out plastic. For walls it may be necessary to fit two wraps depending on the fire risk areas concerned and if the wall thickness exceeds e.g. 150 mm.

According to this, intumescent pipe wraps are used to prevent fire penetration in plastic pipes that pass through walls or floors for a specified period of up to at least two hours. These known pipe wraps are manufactured as a sealed unit to the correct length and width to suit the pipe diameter and fire rating. The general benefit of the well known intumescent pipe wraps as described before is the simplicity of their construction.

Furthermore, EP 0 486 299 A1 discloses an intumescent firestop device having a collar. This device effectively and efficiently channels heat to an intumescent material so that the intumescent material expands quickly and uniformly. An inner surface of the collar has a plurality of heat conducting tabs that extend outwardly and secure the intumescent material to the collar. The heat conducting tabs extend into the intumescent material and thereby effectively channel heat from a fire into the interior regions of the intumescent material so that the intumescent material expands quickly and uniformly. The collar further includes a first interlocking end having at least one opening. The opening is configured to receive a finger on a second interlocking end of the collar. The inter-engagement of the finger and opening allows the collar to be firmly secured about a section of a pipe. The collar typically has a plurality of releasably secured Z-shaped mounting clips. The mounting clips are used to secure the collar to a firm, structural surface such as a wall or a ceiling having an opening through which the pipe passes.

Both intumescent firestop solutions described above have the disadvantages that on the one hand for each diameter of a pipe or the like a certain device is needed so that for different pipes different devices have to be hold available. Additionally, the installation of these firestop devices is relatively complicated. In the first step the firestop devices have to be arranged in the intended position and held with one hand. With the other hand the firestop devices then have to be closed and secured, so that the firestop devices are tightened around the pipe. Especially hereby it is not simple to move the firestop device to a position within the wall, the ceiling or the floor in the building where the position is intended.

SUMMARY

This section provides a general summary of the disclosure, and is not a comprehensive disclosure of its full scope or all of its features.

It is an object of the disclosure to provide an intumescent fire sleeve which is easy to arrange around a conduit and easy to move into an intended position after the intumescent fire sleeve is arranged around a conduit, such as a pipe, a cable or a device penetrating a wall, a ceiling or a floor in a building.

The intumescent fire sleeve for a conduit penetrating a wall, a ceiling or a floor in a building according to this disclosure has at least one carrier being connected to the layer of intumescent material. This carrier has spring-loaded characteristics and the carrier has the ability to coil onto itself in a spiral manner from a non-applied position to an applied position. This means that the intumescent fire sleeve according to the disclosure can be installed one handed in that the intumescent fire sleeve can be caused from a non-applied position, for example an elongate position to an applied position in which the intumescent fire sleeve is coiled onto the conduit penetrating the wall, the ceiling or the floor in a spiral manner. In this position the intumescent fire sleeve is clamp fitted to the pipe, the cable or the device penetrating the wall, the ceiling or the floor, and because of the spring-loaded characteristics the intumescent fire sleeve can easily be moved in lengthwise direction of the pipe or the like. Because of the carrier connected to the layer of intumescent material the intumescent fire sleeve according to the disclosure has perfect tightening characteristics under fire conditions when the intumescent material expands against the structure and for example fills the void left by the burnt out plastic pipe.

According to a preferred embodiment the fire sleeve has a carrier which has the ability to coil itself in a spiral manner with an inner diameter D that is less than the length L divided by $\pi$ ($D<L/\pi$). According to this feature it is assured that the intumescent fire sleeve surrounds the whole circumference of the conduit penetrating the wall, the ceiling or the floor in the building. In one embodiment the length of the carrier is a little bit longer than the circumference of the pipe or the like so that the ends of the carrier overlap each other.

Preferably the carrier is made of metal and/or resin in form of a sheet and/or at least one wire having spring-loaded characteristics. To use these materials for the carrier assures the intended spring-loaded characteristics so that the carrier and therefore the sleeve will be in full contact with the circumference of the pipe or the like.

According to a further embodiment the layer is divided into at least two parts spaced apart from each other in longitudinal direction of the carrier and/or in that the layer is provided with notches running perpendicular to the longitudinal direction of the carrier.

This embodiment has the advantage that the fire sleeve can easily be divided into parts by cutting the carrier in the area of the notches or between the two parts of the layer. Furthermore, if the fire sleeve is used in total the parts spaced apart from each other and/or the notches have the advantage that the layer of intumescent material which is in contact with the outer surface of the pipe or the like is closed in circumferential direction of the pipe.

According to another embodiment of the disclosure the layer has a shorter length in longitudinal direction than the carrier. This embodiment ensures that the layer is in full contact with the circumference of the pipe or the like and that the carrier having a longer length than the layer overlaps in the area of the two distant ends of the layer.

Preferably the layer is connected to the carrier in a way that carrier and layer are relatively moveable to each other in longitudinal direction of layer and carrier.

This embodiment ensures that the layer is in contact with the circumference of the pipe or the like even if the carrier is not arranged in the neutral axis of the fire sleeve surrounding the pipe or the like.

To avoid overlapping ends of the layer which may result in an opening of the sealing of the fire sleeve it is preferred according to a further embodiment that the layer has a length in longitudinal direction of the carrier which is equal to the outer circumference of the pipe, the cable or the device being in contact with the layer.

A further embodiment of the fire sleeve is characterized in that the carrier is provided with fixing elements which are used to connect the carrier with the wall, the ceiling or the floor of the building. Such an embodiment can be connected to the building in cases where the fire sleeve is arranged in front of a hole through which the pipe, the cable or the device penetrates the wall, the ceiling or the floor, or in cases in which the intumescent fire sleeve is arranged inside the hole. In certain cases it is helpful to fix the intumescent fire sleeve inside the hole of the wall, the ceiling or the floor especially if a relative movement of the conduit to the building is possible.

The carrier and/or the layer can be provided with measuring means indicating where to shorten at least the layer to a desired length for mounting. Such a fire sleeve can be part of a coil of several intumescent fire sleeves and can be cut from the coil in the desired length which is the needed length for a certain circumference of the pipe or the like. Preferably, the measuring means is running in lengthwise direction of the plurality of intumescent fire sleeves which preferably are connected to each other in an area of a longitudinal end of layer and carrier.

According to a further embodiment the carrier is embedded between two layers being arranged parallel to each other. In this embodiment the carrier is arranged in the neutral axis of the fire sleeve. The two layers embedding the carrier are in direct contact with the outer surface of the pipe or the like and the inner surface of the hole in the building. Nevertheless, it is not necessary that both layers have identical thicknesses. Preferably, the layer being in contact with the outer surface of the pipe or the like is thicker than the layer being in contact with the inner surface of the hole in the building.

The layer may be provided with a coverage e. g. a foil, whereby a cavity is formed between the layer and the coverage and whereby the carrier is arranged in the cavity. Preferably, the carrier is freely moveable within the cavity, so that the carrier is not directly connected to the layer. This embodiment makes it possible to use a wire-like carrier having a length which is the same as the length of the layer or even longer or shorter. Preferably, two cavities are formed between the layer and the coverage being in distance to each other and housing two wire-like carriers running parallel to each other.

Finally, in one embodiment the carrier is fixable in its extended position, but can be caused to coil onto itself by applying a force to the carrier and/or the layer in a direction perpendicular to the longitudinal direction of the layer and/or the carrier.

With respect to this embodiment the carrier is made of a sheet metal which is spring-loaded and tends to coil itself when the surfaces of the carrier are plain and which stays in a longitudinal direction when the surfaces of the carrier are in a slight U-form in cross-section. This is also known as a bi-stable metal sheet. According to this the carrier can be forced to coil onto itself in a spiral manner if the carrier is moved from the U-shaped form in cross-section to the even form of the carrier.

It is another object of the disclosure to provide a number of intumescent fire sleeves for conduits being provided to penetrate a wall, a ceiling or a floor in a building which can be easily handled depending on the intended use with respect to the pipe or the like.

To solve this object a coil of several intumescent fire sleeves for conduits being provided to penetrate a wall, a ceiling or a floor in a building is proposed whereby each intumescent fire sleeve comprises at least one layer of intumescent material and the carrier being connected to the layer of intumescent material and whereby said fire sleeve has a length that at least corresponds to the circumference of the conduit for which it is intended, whereby each layer has a rectangular shape with two side surfaces and two surfaces connecting the side surfaces whereby at least two fire sleeves are arranged in a line and are connected via one edge of each fire sleeve being adjacent to each other.

Such a coil can contain several intumescent fire sleeves being detachable connected to each other via their end surfaces connecting their side surfaces. Furthermore, the coil can contain two or more rows of fire sleeves whereby the fire sleeves are connected to each other as described before and whereby the rows of sleeves are connected via the side surfaces of the sleeves of each row. The fire sleeves can be easily disconnected from each other which means that a fire sleeve can be cut from the coil and used as intended whereafter a next fire sleeve can be cut from the coil.

To use two or more lines or rows of fire sleeves in one coil has the advantage that two fire sleeves of two parallel lines can be cut from the coil while being connected to each other via their side surfaces so that the two fire sleeves can be used as one fire sleeve for example for the use in the area of a hole in the building, especially a wall, a floor or a ceiling having a higher thickness than the width of one sleeve. Of course, such use can be performed with three or four fire sleeves being connected to each other via their side surfaces and being cut from a coil having three or four lines of fire sleeves.

A further object of the disclosure is to provide a method for installation of an intumescent fire sleeve to the circumference of a conduit, such as pipe, a cable or a device penetrating a wall, a ceiling or a floor in a building, which method allows an easy installation of the sleeve as well as an easy adjustment of the sleeve with respect to the pipe or the like and/or the wall or the like.

The solution of this object is provided by a method whereby said fire sleeve having a length which at least corresponds to the circumference of the conduit is caused to take a shape of the circumference of the conduit by using the spring-loaded characteristics of the carrier to coil itself onto the conduit.

In practice, the intumescent fire sleeve is brought into contact with the circumference of the pipe or the like while being in an extended position. After the intumescent fire sleeve has reached the contact with the circumference of the pipe or the like the carrier is allowed to coil itself onto the pipe or the like by using its inherent spring-loaded characteristics. As the carrier is connected with the layer of intumescent material the intumescent material surrounds the circumference of the pipe or the like.

In the next step of the method the intumescent fire sleeve surrounding the circumference of the pipe or the like can be moved in longitudinal direction of the pipe or the like to the intended place inside the hole in the building. Finally, all apertures between the inside surfaces of the hole and the outside surface of the intumescent fire sleeve are filled with mortar or a firestop compound which is hardened afterwards.

According to an embodiment of the method according to the disclosure the fire sleeve is applied onto the conduit so that the inner layer is in clamp-fitted contact with an outer surface of the conduit. Finally, it is of advantage that the layer of intumescent material is in contact with the conduit so that in case of a fire the intumescent material expands against the structure and fills the void left by the burnt out plastic of the pipe or the like. Several intumescent fire sleeves can be used side by side in the longitudinal direction of the pipe or the like.

The disclosure and its particular features and advantages will become more apparent from the following detailed description considered with reference to the accompanying drawings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1a-c show a first embodiment of an intumescent fire sleeve in a perspective view in three different positions;

FIG. 2 shows the fire sleeve according to FIG. 1 used around a pipe in a hole in a wall;

FIG. 3 shows the fire sleeve according to FIGS. 1 and 2 wrapped around a pipe;

FIG. 6 shows a third embodiment of an intumescent fire sleeve in an end view;

FIG. 7 shows the fire sleeve according to FIG. 6 wrapped around a pipe;

FIG. 8 shows a coil of several fire sleeves in a perspective view;

FIG. 9 shows a fourth embodiment of an intumescent fire sleeve in a plan view;

FIG. 10 shows a fifth embodiment of an intumescent fire sleeve in a side view;

FIG. 11 shows the fire sleeve according to FIG. 9 wrapped around a pipe and fixed to a wall;

FIG. 12 shows a sixth embodiment of an intumescent fire sleeve in a perspective view;

FIG. 13 shows a seventh embodiment of an intumescent fire sleeve in an end view;

FIG. 14 shows the fire sleeve according to FIG. 13 in a plan view along the intersection line XIV-XIV in FIG. 13;

FIG. 15 shows a further embodiment of an intumescent fire sleeve in a perspective view and FIG. 16 shows a further embodiment of an intumescent fire sleeve in a side view.

Corresponding reference numerals indicate corresponding parts throughout the several views of the drawings.

DETAILED DESCRIPTION

Figure 5:
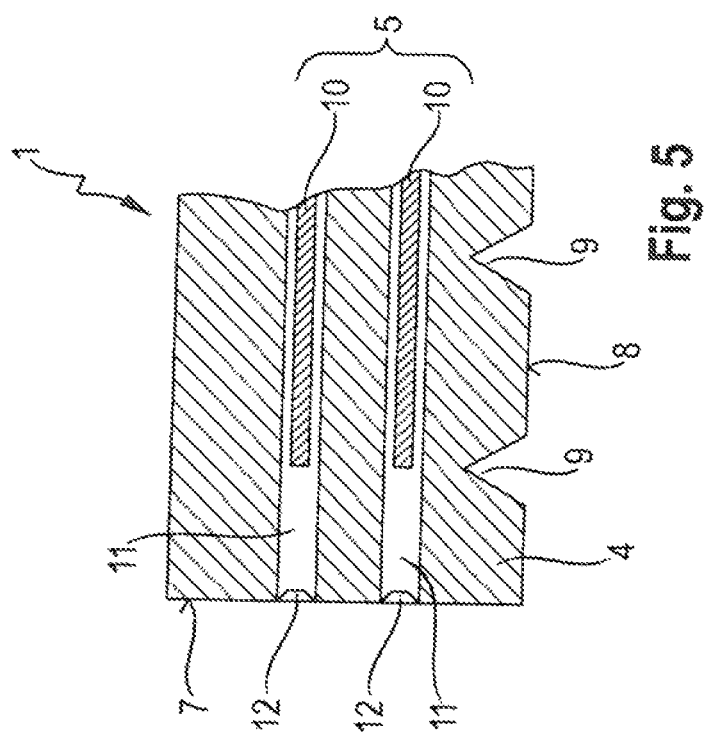
FIG. 5 shows the fire sleeve according to FIG. 4 in a longitudinal section along the intersection line V-V in FIG. 4

Example embodiments will now be described more fully with reference to the accompanying drawings.

FIG. 1a-c shows a first embodiment of an intumescent fire sleeve 1 in an elongated position. The fire sleeve 1 is provided for a pipe 2 (FIGS. 2 and 3) penetrating a wall 3 (or a ceiling or a floor) in a building. Said fire sleeve 1 comprises a layer 4 of intumescent material and a carrier 5 made of a metal sheet and having a thickness being smaller than the thickness of the layer 4.

Layer 4 and carrier 5 are connected by two rivets 6 being positioned at one end of the fire sleeve 1 and which allow a relative movement of the layer 4 to the carrier 5 when the fire sleeve 1 is used as it will be described afterwards.

Of course, other possibilities of connecting the layer 4 and the carrier 5 are possible. Layer 4 and carrier 5 may be connected by gluing for example, whereby a glue is only applied at one end of the layer 4 and/or carrier 5, so that only a part of the surface of these elements are in contact with the glue.

Additionally the fire sleeve 1 can comprise a further layer made of intumescent material and/or a layer made of mineral fibres.

FIGS. 2 and 3 show the intended use of the fire sleeve 1 and especially in FIG. 3 it can be seen that said fire sleeve 1 has a length L that at least corresponds to a circumference of the pipe 2 for which it is intended. At least the carrier 5 has spring-loaded characteristics and said carrier 5 which is shown in an elongated position in FIG. 1 has the ability to coil onto itself in a spiral manner. In use the fire sleeve 1 according to FIG. 1 is coiled around the pipe 2 and in FIG. 3 it can be seen that two end surfaces 7 are in contact with each other. These end surfaces 7 connect two parallel running side surfaces 8 of the layer 4 and run perpendicular to these side surfaces 8.

In FIG. 2 mortar or a fire stop compound 24 is inserted into the hole in the wall 3. The mortar or fire stop compound 24 is in contact with the fire sleeve 1 and surrounds the pipe 2.

To keep the fire sleeve 1 in an elongated form as shown in FIG. 1c the carrier 5 can be made of a bi-stable metal sheet which in a first condition is spring-loaded to coil onto itself as shown in FIG. 1a and in a second condition is slightly bent into a U-form with respect to its longitudinal axis, so that it has a stable straight shape (see FIG. 1c). A fire sleeve 1 according to this embodiment having such a bi-stable carrier 5 is easily applied to a pipe 2 or the like by first straighten it to the condition shown in FIG. 1c and then arranging it with the layer 4 against the pipe 2. Finally a force is applied to the sleeve 1 in a direction perpendicular to the longitudinal direction of the sleeve 1 which will cause the sleeve 1 to coil itself around the pipe 2. It can then easily be moved along the pipe 2 to a desired position.

Figure 4:
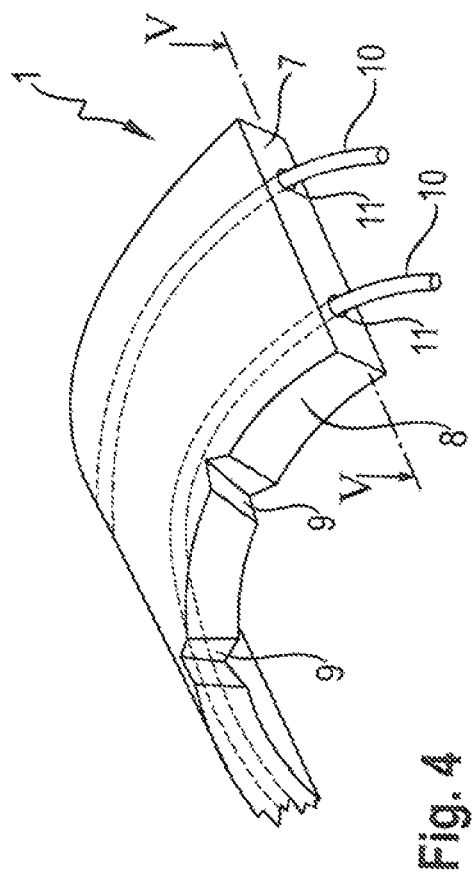
FIG. 4 shows a second embodiment of an intumescent fire sleeve in a perspective view.

FIGS. 4 and 5 show a second embodiment of the fire sleeve 1. FIG. 4 shows the second embodiment of the fire sleeve 1 in a perspective view and the fire sleeve 1 according to FIG. 4 comprises the layer 4 of intumescent material. One side surface 8 is provided with measuring means in the form of V-shaped notches 9 which are arranged in regularly distances to each other. These notches 9 can be used to measure and cut the fire sleeve 1 into a desired length which is intended to use with respect to a pipe 2 having a certain diameter. Furthermore, the notches 9 increase the flexibility of the layer 4 to simplify the fitting of the fire sleeve 1 to the pipe 2.

The carrier 5 is represented in the embodiment according to FIGS. 4 and 5 by two spring-loaded wires 10 being incorporated into two canals 11 running in lengthwise direction of the layer 4. The canals 11 are closed by plugs 12 being inserted into the canals 11 and fixed for example by gluing.

As can be seen from FIG. 5 the wires 10 forming the carrier 5 have a length being shorter than the length of the layer 4 so that the wires 10 are free to move within the canals 11. The movement of the wires 10 in the canals 11 is limited by the plugs 12.

Both wires 10 have spring-loaded characteristics and have the ability to coil the whole sleeve onto itself in a spiral manner.

A further embodiment of an intumescent fire sleeve 1 is shown in FIGS. 6 and 7. FIG. 6 shows the fire sleeve 1 having two layers 4 of intumescent material. The carrier 5 is sandwiched between the two layers 4 and consists of two strips of metal sheet which are spaced apart from each other and from the side surfaces 8 of the layers 4. Both strips are connected to the layer 4.

FIG. 8 shows a coil 13 of several intumescent fire sleeves 1. The fire sleeves 1 are arranged in lines 14 and in FIG. 8 three lines 14 are shown whereby the fire sleeves 1 of each line 14 are connected via their end surfaces 7 to each other. Furthermore, the lines 14 of several fire sleeves 1 are connected to each other via the side surfaces 8 of the fire sleeves 1 being arranged neighboring to each other.

The coil 13 according to FIG. 8 simplifies the production and the use of the fire sleeves 1 as a package of several fire sleeves 1 and each fire sleeve 1 can be separated from the coil 13 by cutting or by breaking if pre-determined breaking points are provided between the lines 14 and/or the fire sleeves 1 in the coil 13.

A further embodiment of the fire sleeve 1 is shown in FIGS. 9 to 11. The fire sleeve 1 according to FIG. 9 comprises the layer 4 of intumescent material and the carrier 5 having the spring-loaded characteristics as described with respect to FIGS. 1 to 3.

The carrier 5 of the embodiment according to FIG. 9 has four latches 15 erecting from one side surface 8 perpendicular to the lengthwise direction of the carrier 5. Each latch 15 is provided with a hole 16 in which screws 17 (FIG. 11) can be inserted to fix the carrier 5 to the wall 3 (FIG. 11). The latches 15 are bendable fixed to the carrier 5 so that the latches 15 can be bend to extend in a direction parallel to the surface of the wall and perpendicular to the carrier 5.

The use of the fire sleeve 1 according to FIG. 9 is shown in FIG. 11.

The fire sleeve 1 according to FIG. 9 is furthermore provided with shorter latches 18 being arranged at the second side surface 8 of the carrier 5 and erecting in the opposite direction of the latches 15. The function of these latches 18 is to keep the layer 4 of intumescent material in place after fixing the fire sleeve 1 around the pipe 2 as it is shown in FIG. 11. The advantage of this embodiment is that in the case of a fire the layer 4 of intumescent material can only expand in the direction towards the pipe 2.

FIG. 10 shows a further embodiment of an intumescent fire sleeve 1 having a carrier 5 with the above-mentioned characteristics and a layer 4 of intumescent material. The layer 4 is divided into several blocks 19 of intumescent material. The blocks 19 are of equal dimensions and prismatic. Furthermore, the blocks 19 are fixed spaced apart to each other to the carrier 5 and the distances between the blocks 19 are equal over the length of the carrier 5. This embodiment according to FIG. 10 has the advantage that the fire sleeve 1 is more flexible even if the intumescent material used for the blocks 19 is of higher density.

A further embodiment of an intumescent fire sleeve 1 is shown in FIGS. 12 to 14. This embodiment comprises the layer 4 and according to FIG. 12 the carrier consists of a wire 10 having spring-loaded characteristics as already described and being connected to a surface of the layer 4. The wire 10 runs lengthwise of the layer 4 and is arranged approximately in the middle of the layer 4 between the two side surfaces 8. On top of the surface carrying the wire 10 a coverage 20, for example a foil, is fixed to the layer 4. The coverage 20 covers the wire 10. Furthermore, the coverage has a surface 21 being used to present product information, brands or the like.

FIGS. 13 and 14 shows embodiments of the fire sleeve 1 according to FIG. 12 wherein the carrier comprises two wires 10 being arranged on top of the layer 4 and covered by the coverage 20. The wires 10 are provided in pocket-like cavities 22 being provided between the surface of the layer 4 and the coverage 20. The wires 10 are freely moveable in the cavities 22. A further embodiment of a fire sleeve 1 is shown in FIG. 15. This embodiment of the intumescent fire sleeve 1 comprises the layer 4 and two wires 10 forming the carrier 5 and being fixed to parallel side surfaces 8 of the layer 4.

Finally FIG. 16 shows an embodiment of an intumescent fire sleeve 1 comprising the layer 4 and the carrier 5, wherein the layer 4 is divided in sections by V-shaped notches which allow to cut the fire sleeve 1 into parts of desired length and which on the other hand allow to wrap the fire sleeve 1 more easily around a pipe 2 especially if the pipe 2 has a small diameter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. An intumescent fire sleeve for a conduit penetrating a wall, a ceiling or a floor in a building, said fire sleeve comprising at least one layer of intumescent material and one carrier being connected to the layer of intumescent material, and said fire sleeve having a length (L) that at least corresponds to a circumference of the conduit for which it is intended, wherein at least the carrier has spring-loaded characteristics and that the carrier, in a non-applied position, has the ability to coil onto itself, wherein the carrier is fixable in an extended position and wherein the carrier can be caused to coil onto itself by applying a force to the carrier and/or the layer in a direction perpendicular to the longitudinal direction of the layer and/or the carrier, wherein the carrier is made of a bi-stable metal sheet, which in a first condition is spring-loaded to coil onto itself and in a second condition is bent into a U-form with respect to its longitudinal axis, so that it has a stable straight shape, wherein the layer is connected to the carrier in a way that the carrier and the layer are relatively movable to each other in the longitudinal direction of the layer or the carrier, the carrier being formed as a sheet positioned on one side of the intumescent material.

2. The fire sleeve according to claim 1, wherein the carrier has the ability to coil itself in a spiral manner with an inner diameter (D) that is less than the length (L) divided by $\pi$ ($D<L/\pi$).

3. The fire sleeve according to claim 1, wherein the layer has a shorter length in longitudinal direction than the carrier.

4. The fire sleeve according to claim 1, wherein the layer has a length in longitudinal direction of the carrier which is equal to the outer circumference of the conduit for which it is intended.

5. The fire sleeve according to claim 1, wherein the layer and the carrier are connected to each other in an area of a longitudinal end of layer and carrier.

\* \* \* \* \*